(12) United States Patent
Shin et al.

(10) Patent No.: US 11,450,887 B2
(45) Date of Patent: Sep. 20, 2022

(54) ELECTROLYTE FOR LITHIUM SECONDARY BATTERY AND LITHIUM SECONDARY BATTERY CONTAINING SAME

(71) Applicants: Hyundai Motor Company, Seoul (KR); Kia Motors Corporation, Seoul (KR); UNIST (Ulsan National Institute of Science and Technology), Ulsan (KR)

(72) Inventors: KyoMin Shin, Gyeonggi-do (KR); DongHui Kim, Gyeonggi-do (KR); SangJoon Lee, Gyeonggi-do (KR); Seung Ho Ahn, Gyeonggi-do (KR); SungHoon Lim, Gyeonggi-do (KR); Nam-Soon Choi, Ulsan (KR); Sung You Hong, Ulsan (KR); Choonki Kim, Ulsan (KR); Koeun Kim, Ulsan (KR); Yeonkyoung Kim, Ulsan (KR)

(73) Assignees: Hyundai Motor Company, Seoul (KR); Kia Motors Corporation, Seoul (KR); UNIST (Ulsan National Institute of Science and Technology), Ulsan (KR)

(*) Notice: Subject to any disclaimer, the term of this patent is extended or adjusted under 35 U.S.C. 154(b) by 399 days.

(21) Appl. No.: 16/697,799

(22) Filed: Nov. 27, 2019

(65) Prior Publication Data
US 2020/0194836 A1 Jun. 18, 2020

(30) Foreign Application Priority Data
Dec. 14, 2018 (KR) .......................... 10-2018-0161781

(51) Int. Cl.
*H01M 10/0567* (2010.01)
*H01M 10/0525* (2010.01)

(52) U.S. Cl.
CPC ... *H01M 10/0567* (2013.01); *H01M 10/0525* (2013.01)

(58) Field of Classification Search
CPC ......... H01M 10/0567; H01M 10/0525; H01M 2300/0034; H01M 2300/004; H01M 10/0569; H01M 10/052; H01M 2220/20; H01M 2300/0037; H01M 4/364; H01M 4/386; H01M 4/525; H01M 4/587; Y02E 60/10
(Continued)

(56) References Cited

U.S. PATENT DOCUMENTS 8,715,865 B2  5/2014  Xu et al.
8,795,903 B2  8/2014  Smart et al.
(Continued)

FOREIGN PATENT DOCUMENTS

JP  2011187234 A  9/2011
KR  20170111745 A  10/2017

*Primary Examiner* — Gary D Harris
(74) *Attorney, Agent, or Firm* — Fox Rothschild LLP (57) ABSTRACT

Disclosed herein are an electrolyte for a lithium secondary battery and a lithium secondary battery including the same. The disclosed lithium secondary battery includes: a cathode; an anode; a separator interposed between the cathode and the anode; and an electrolyte, wherein the electrolyte includes: a lithium salt; and a solvent including a perfluorinated ether-based solvent, fluoroethylene carbonate (FEC), and ethylmethyl carbonate (EMC).

11 Claims, 10 Drawing Sheets

(58) Field of Classification Search
USPC .......................................................... 429/188
See application file for complete search history.

(56) References Cited

U.S. PATENT DOCUMENTS

| | | |
|---|---|---|
| 2011/0052980 A1 | 3/2011 | Sakata et al. |
| 2014/0134501 A1 | 5/2014 | Li et al. |
| 2015/0171472 A1* | 6/2015 | Kim .................. H01M 10/0568 |
| | | 429/188 |
| 2019/0372148 A1* | 12/2019 | He .................... H01M 10/0569 |

* cited by examiner

ELECTROLYTE FOR LITHIUM SECONDARY BATTERY AND LITHIUM SECONDARY BATTERY CONTAINING SAME

CROSS-REFERENCE TO RELATED APPLICATION(S)

This application is based on and claims priority under 35 U.S.C. § 119 to Korean Patent Application No. 10-2018-0161781, filed on Dec. 14, 2018 in the Korean Intellectual Property Office, the invention of which is incorporated by reference herein in its entirety.

TECHNICAL FIELD

Embodiments of the present invention relate to an electrolyte for a lithium secondary battery and a lithium secondary battery including the same.

BACKGROUND

Lithium secondary batteries including an electroactive material have higher driving voltage and higher energy density than lead batteries or nickel/cadmium batteries. Accordingly, the lithium secondary batteries have drawn attention as energy storage devices of electric vehicles (EVs) and hybrid electric vehicles (HEVs).

Energy densification of batteries may be the most important issue to increase travelling distance of electric vehicles. To achieve this, capacities of available cathode materials and anode materials need to be increased or driving voltages of the batteries need to be increased. For instance, safety of electrolytes against oxidation is a very important factor to increase the driving voltage of the batteries. In general, carbonates, esters, ether, or ketones have been used alone or in combination as a non-aqueous organic solvent.

An electrolyte including such a non-aqueous organic solvent is oxidized and decomposed at a high voltage of 5 V or less to form a resistive layer on a cathode interface, causing depletion of the electrolyte. Thus, lifespan and output characteristics of a battery may deteriorate.

Particularly, because a carbonate-based organic solvent that is a flammable organic material is decomposed in a high voltage environment and also generates gas via side reactions with an electrode active material, the safety of the battery may deteriorate. Due to a low flash point and high volatility, the carbonate-based organic solvent easily causes a flame reaction and is used as a fuel in a combustion reaction of an electrode material. The combustion reaction between the electrode material and the electrolyte rapidly increases the temperature of the battery causing thermal runaway. To inhibit such a combustion reaction, a perfluoro-based solvent may be used to impart flame retardancy thereto. Meanwhile, although the perfluoro-based solvent has excellent flame retardancy, low miscibility with same salts and precipitation of the lithium salts caused thereby may deteriorate battery performance.

Therefore, development of an electrolyte having excellent voltage resistance may be a key factor to increase the energy density of the lithium secondary battery. Particularly, there is a need to develop large- or medium-sized lithium secondary batteries for electric vehicles or hybrid vehicles having excellent output/lifespan characteristics and available in a high-voltage, high-temperature environment.

SUMMARY

In preferred aspects, the present invention may provide an electrolyte composition for a lithium secondary battery that may operate in a high-temperature, high-voltage environment and have excellent output characteristics, and a lithium secondary battery including the same.

Other aspects of the invention will be set forth in part in the description which follows and, in part, will be obvious from the description, or may be learned by practice of the invention.

In accordance with an aspect of the present invention, a lithium secondary battery may include: a cathode; an anode; a separator interposed between the cathode and the anode; and an electrolyte. In particular, the electrolyte may include: a lithium salt; and a solvent component including a perfluorinated ether-based solvent represented by Formula 1 below, fluoroethylene carbonate (FEC), and ethylmethyl carbonate (EMC).

Formula 1 wherein R and R' are independently $(CF_xH_y)_n$, $1 \leq n \leq 6$, $0 \leq x+y \leq 3$, $0 \leq x \leq 3$, and x, y, and n are each independently natural numbers. The perfluorinated ether-based solvent may include one or more selected from the group consisting of nonafluorobutyl methyl ether, nonafluorobutyl ethyl ether, nonafluorobutyl-2-fluoroethyl ether, nonafluorobutyl-2,2,2-trifluoroethyl ether, nonafluorobutyl pentafluoroethyl ether, nonafluoropropyl ethyl ether, nonafluoropropyl propyl ether, and heptafluoropropyl methyl ether.

A content of the perfluorinated ether-based solvent suitably may be, for example, in a range of about 20 to 50 vol % based on a total volume of the electrolyte composition.

The FEC content suitably may be, for example, about 20 vol % or less based on the total volume of the electrolyte composition.

A sum of the FEC content and the content of the perfluorinated ether-based solvent may be in a range of about 30 to 50 vol % based on the total volume of the electrolyte composition.

The EMC content may be in a range of about 50 to 70 vol % based on the total volume of the electrolyte composition.

The solvent component in the electrolyte may further include ethylene carbonate (EC).

The EC content suitably may be, for example, about 10 vol % or less based on the total volume of the electrolyte composition.

The FEC content may be greater than or equal to the EC content.

The electrolyte may have a viscosity of about 5 cP or less.

The lithium salt may include one or more selected from the group consisting of $LiPF_6$, LiFSi, $Li_BF_4$, $LiClO_4$, LiCl, LiBr, LiI, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_5)_4$, $Li(SO_2F)_2N$, and $(CF_3SO_2)_2NLi$.

A cathode active material suitably may include lithium composite including Ni content, for example, of about 20% to 100% based on the total mol of the nickel composite. Preferably, the nickel composite may include a lithium nickel-manganese-cobalt ternary cathode active material or a lithium nickel-manganese composite oxide.

An anode active material may include a silicon-carbon composite.

Further provided is a vehicle that may include the lithium secondary battery as described herein.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present invention, examples of which are illustrated in the accompanying drawings, wherein like reference numerals refer to like elements throughout. This specification does not describe all elements of the embodiments of the present invention and detailed descriptions on what are well known in the art or redundant descriptions on substantially the same configurations may be omitted.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, regions, integers, steps, operations, elements and/or components but do not preclude the presence or addition of one or more other features, regions, integers, steps, operations, elements, components, and/or combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, preferred embodiments of the present invention will be described in detail with reference to the drawings and tables. First, a lithium secondary battery to which an electrolyte for a lithium secondary battery according to the present invention is applied will be described, and then the electrolyte for the lithium secondary battery will be described in detail.

A lithium secondary battery generally includes a cathode, an anode, a separator, and an electrolyte. The lithium secondary battery generally includes a lithium transition metal oxide as a cathode active material and a graphite-based material as an anode active material.

The cathode, the anode, and the separator constituting an electrode assembly may be any cathode, anode, and separator commonly used in the preparation of lithium secondary batteries.

An electrode includes an electrode active material and a binder. For example, an electrode may be formed by coating an electrode slurry prepared by mixing an electrode active material, a binder, a solvent, and a conductive material, on an electrode current collector to a predetermined thickness, and drying and roll-pressing the coated electrode slurry.

The anode active material used in the preparation of the anode may generally be a graphite-based material allowing intercalation and deintercalation of lithium ions, but is not limited to particular graphite-based materials. Also, the anode active material may be a metallic material that may be alloyed with lithium or any mixture of two or more thereof.

According to an exemplary embodiment, the anode active material may include silicon. Also, the anode active material may include a graphite-silicon composite. An anode active material including silicon may include silicon oxide, silicon particles, and silicon alloy particles. Representative examples of the alloy may include, but are not limited to, solid solutions, intermetallic compounds, eutectic alloys, or the like of silicon with aluminum (Al), manganese (Mn), iron (Fe), titanium (Ti), and the like.

The cathode active material includes a compound allowing reversible intercalation and deintercalation of lithium. For example, the cathode active material may include a composite oxide of lithium and at least one metal selected from cobalt, manganese, nickel, or any combination thereof.

An electrolyte composition according to an exemplary embodiment may be used in a lithium secondary battery including an exemplary cathode containing a nickel (Ni)-rich cathode active material. Thus, the cathode may include a lithium nickel-manganese-cobalt ternary cathode active material or a lithium nickel-manganese composite oxide.

Particularly, the lithium nickel-manganese-cobalt ternary cathode active material may include Ni as a main component. Ni as used herein may be an element improving a reversible capacity and lifespan characteristics of a battery and a Ni content may be in the range of about 20% to 100% based on the total mol of the ternary cathode active material. Preferably, the Ni content may be of about 60% or greater.

As the binder, carboxymethyl cellulose (CMC)/styrene-butadiene rubber (SBR), which is an aqueous binder used in a graphite-based anode, may be suitably used. When the anode includes a graphite-silicon composite, the binder may be a mixed binder of the CMC/SBR, which is an aqueous binder used in graphite-based anodes to increase adhesiveness, and a polymer binder, such as Heparin, Heparin polymerized with Dopamine, and lithium polyacrylate (Li-PAA), which may be used to increase adhesive strength and inhibit volume expansion of silicon-based anodes.

The electrode according to an exemplary embodiment may further include a dispersion medium, a conductive material, a viscosity modifier, a filler, and the like in addition to the electrode active material and the binder.

In the lithium secondary battery according to the present invention, the separator may be used to provide a pathway of lithium ions and physically separate the opposite electrodes from each other. Any separator commonly used in lithium secondary batteries may be used without limitation, particularly, any separator having a low resistance against migration of ions of the electrolyte and excellent electrolyte-retaining ability may be used.

The separator may suitably include a porous polymer film. For example, a porous polymer film may include a polyolefin-based polymer such as an ethylene homopolymer, a propylene homopolymer, an ethylene/butene copolymer, an ethylene/hexene copolymer, or an ethylene/methacrylate copolymer, In addition, the porous polymer film may be used alone or in a stacked structure. Alternatively, a ceramic coating may be used in the separator, without being limited thereto.

Hereinafter, the electrolyte of the lithium secondary battery according to an exemplary embodiment will be described in detail. Hereinafter, volume percent (vol %) will be used as units, unless otherwise stated.

The electrolyte may include a lithium salt and a solvent component, e.g., non-aqueous organic solvent, and may further include an additive to improve charging and discharging characteristics, to prevent overcharging, or the like.

As described above, driving voltage of a battery needs to be increased to achieve high energy density of the battery for increasing traveling distance of an electric vehicle. In order to increase the driving voltage of the battery, the safety of the electrolyte against oxidation is a very important factor.

In general, carbonate, ester, ether, or ketone is used alone or in combination as a non-aqueous organic solvent of the electrolyte.

When mixed with an electrolyte, a carbonate-based organic solvent, particularly, ethylene carbonate (EC), enhances dissociation of the lithium salt (generation of Li$^+$ ions) due to high dielectric properties. In general, the carbonate-based organic solvent is mixed in a volume percent of about 20 to 30%. When the volume percent of the carbonate-based organic solvent is less than about 20%, battery performance such as output characteristics and capacity may deteriorate due to a low degree of dissociation of the salt. When the volume percents of the carbonate-based organic solvent is greater than about 30%, viscosity increases to hinder the movement of lithium ions, thereby deteriorating battery performance.

According to exemplary embodiments of the present invention, a large- or medium-sized lithium secondary battery having improved safety with excellent output/lifespan characteristics in a high temperature/high voltage environment may be provided. Particularly, the safety of the lithium secondary battery is improved by imparting flame retardancy to the lithium secondary battery by introducing a non-flammable, low-viscosity solvent partially substituted with fluorine into the electrolyte composition including a lithium salt and a carbonate-based solvent while minimizing EC content in the electrolyte composition. Also, the deterioration in output/performance of the battery generally caused by introducing a flame retardant thereinto is inhibited.

Hereinafter, components of the electrolyte for a lithium secondary battery according to the disclosed embodiment and a composition ratio of the components will be described in detail. Hereinafter, volume percent (vol %) will be used as units, unless otherwise stated.

The electrolyte composition for a lithium secondary battery according to an exemplary embodiment of the present invention includes a lithium salt, and a solvent component. In particular, the solvent component may include a perfluorinated ether-based solvent, fluoroethylene carbonate (FEC), and ethylmethyl carbonate (EMC).

Although a mixture of linear and cyclic carbonate-based solvents is generally used in an electrolyte for a lithium secondary battery, perfluorinated ether may be introduced thereinto as a cosolvent according to exemplary embodiments of the present invention.

A perfluorinated ether-based solvent has a high flash point of 150° C. or greater and a low viscosity of about 5 cP or less. For instance, by using this, degradation of the electrolyte may be prevented and mobility of lithium ions may be improved, thereby improving the safety of the battery even for a long-term operation of the battery.

The perfluorinated ether-based solvent may be represented by Formula 1 below.

$$R\text{—}O\text{—}R', \qquad \text{Formula 1}$$

wherein R and R' are each independently $(CF_xH_y)_n$, $1 \leq n \leq 6$, $0 \leq x+y \leq 3$, $0 \leq x \leq 3$, and x, y, and n are each independently natural numbers. For example, the perfluorinated ether-based solvent may include one or more selected from the group consisting of nonafluorobutyl methyl ether, nonafluorobutyl ethyl ether, nonafluorobutyl-2-fluoroethyl ether, nonafluorobutyl-2,2,2-trifluoroethylether, nonafluorobutyl pentafluoroethylether, nonafluoropropyl ethyl ether, nonafluoropropyl propyl ether, and heptafluoropropyl methyl ether. Preferably, the perfluorinated ether-based solvent may be nonafluorobutyl methyl ether.

According to an exemplary embodiment of the present invention, a nonafluorobutyl methyl ether (MFE) represented by Formula 2 below will be described as an example. The MFE that is a fluorinate ether compound having a low viscosity is a flame-retardant solvent which is not generally used as an electrolyte of a lithium secondary battery. Fluorine (F) elements contained in the structure of MFE may improve stability of a compound at high voltage to prevent oxidative decomposition of the compound at high voltage.

Formula 2

According to an exemplary embodiment of the present invention, MFE may provide flame retardancy to the electrolyte. MFE forms a stable protective layer on the surface of the electrode to inhibit continuous decomposition reactions of a bulk electrolyte, and fluoride radicals (F.) generated in the series of reactions which will be described below play a role in terminating chain reaction in a combustion process.

Propagation (Highly Exothermic Reaction)

$$HO. + CO \rightarrow CO_2 + H.$$

Chain Reaction $$RH \rightarrow R. + H.$$

$$R. + O_2 \rightarrow ROO. + H.$$

Chain Transfer $$O. + \text{F-based solvent} \rightarrow RO. + F.$$

Termination

$$RO. + \text{F-based solvent} \rightarrow ROH + F.$$

Thus, when the electrolyte is exposed to a flame, a time of combustion may be shortened, thereby achieving both the flame retardancy of the electrolyte and the safety of the battery.

Thus, according to an exemplary embodiment of the present invention, MFE content may be 20% or greater based on the total volume of the electrolyte composition to obtain the above-described effects. However, when the MFE content is excessive, MFE may become immiscible with the lithium salt, and thus an upper limit of the MFE content may be of about 50% according to the present invention. Preferably, the MFE content may be in the range of about 20% to 40% based on the total volume of the electrolyte composition. When the MFE solvent is included within the above-described range, flame retardancy may be achieved while minimizing an increase in viscosity of the electrolyte.

Also, the electrolyte composition for a lithium secondary battery according to an exemplary embodiment may include a carbonate solvent.

The carbonate solvent may allow lithium ions to move from the cathode to the anode or from the anode to the cathode in a cell during charging and discharging and may be fluoroethylene carbonate (FEC) represented by Formula 3 below and linear ethylmethyl carbonate (EMC) represented by Formula 4 below.

Formula 3

Formula 4

FEC ensures flame retardancy of the electrolyte together with MFE and dissociates the lithium salt. However, when used in an excess amount, FEC may easily be decomposed at a high temperature, and thus storage properties and durability at the high temperature may deteriorate. Thus, FEC content may be of about 20% or less based on the total volume of the electrolyte composition.

Also, a combined content of the MFE and the FEC may be in the range of about 30% to 50% based on the total volume of the electrolyte composition in consideration of miscibility with the lithium salt while achieving flame retardancy of the electrolyte.

Meanwhile, although MFE has excellent flame-retardant effects, it has been difficult to apply MFE to electrolyte compositions for lithium secondary batteries due to low miscibility with some lithium salts. Thus, according to an exemplary embodiment of the present invention, EMC may be introduced into the electrolyte composition for a lithium secondary battery, to obtain components of the electrolyte composition for a lithium secondary battery in which the EC content is reduced.

The EMC is a linear carbonate-based solvent added to improve miscibility of MFE with the lithium salt and EMC content may be 50% or more according to the present invention. For example, EMC may be added in a more amount than that of MFE. That is, the electrolyte composition for a lithium secondary battery according to the disclosed embodiment may satisfy EMC/MFE>1. However, when the EMC content is excessive, flame retardancy may not be obtained. Thus, an upper limit of the EMC content may be 70% according to the present invention. Preferably, the EMC content may be in the range of 50% to 70%.

The electrolyte composition for a lithium secondary battery according to an exemplary embodiment may further include ethylene carbonate (EC) represented by Formula 5 below as a solvent.

Formula 5

The EC is a cyclic carbonate-based solvent degrading miscibility of MFE. Preferably, using EC may be avoided as a solvent component of the electrolyte composition for a lithium secondary battery according to an exemplary embodiment of the present invention.

When the electrolyte composition for a lithium secondary battery according to an exemplary embodiment may include EC, an upper limit of the EC content may be about 10% based on the total volume of the electrolyte composition in consideration of the miscibility of MFE with the lithium salt. In this case, FEC capable of securing miscibility of MFE needs to be added to the electrolyte composition together with EC. In this case, the electrolyte composition for a lithium secondary battery according to an exemplary embodiment may satisfy FEC/EC>1.

The electrolyte for a lithium secondary battery according to an exemplary embodiment may have a viscosity of about 5 cP or less, particularly, in the range of about 1 cP to 4 cP. As described above, according to an exemplary embodiment of the present invention, output characteristics of the battery may be improved not only by achieving flame retardancy by introducing the perfluorinated ether-based compound having a low viscosity and but also by improving the mobility of lithium ions by reducing the viscosity of the electrolyte.

In general, when an electrolyte of a lithium secondary battery is in contact with an electrode, redox reactions occur in an interface between the electrolyte and the electrode. As a result, substances such as LiF, $Li_2CO_3$, $LiO_2$, and LiOH are generated on the surface of an anode to form a film that is referred to as a solid electrolyte interface (SEI) layer.

Once the SEI layer is formed at the time of initial charging, the SEI layer prevents occurrence of reactions between lithium ions and the anode or another substance while the battery is repeatedly charged and discharged and serves as an ion tunnel through which only lithium ions pass between the electrolyte and the anode.

Figure 1:
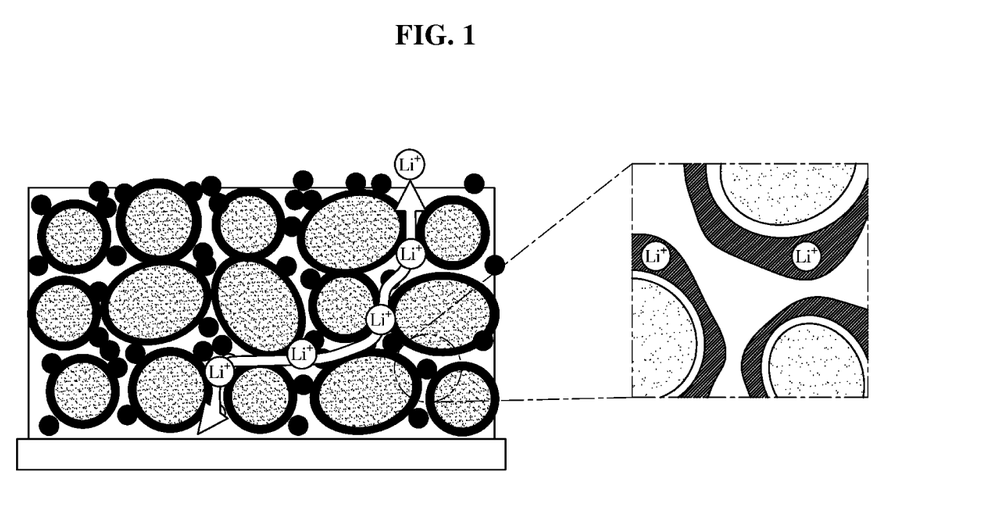
FIG. 1 shows a migration behavior of lithium ions in an exemplary lithium secondary battery.
Figure 2:
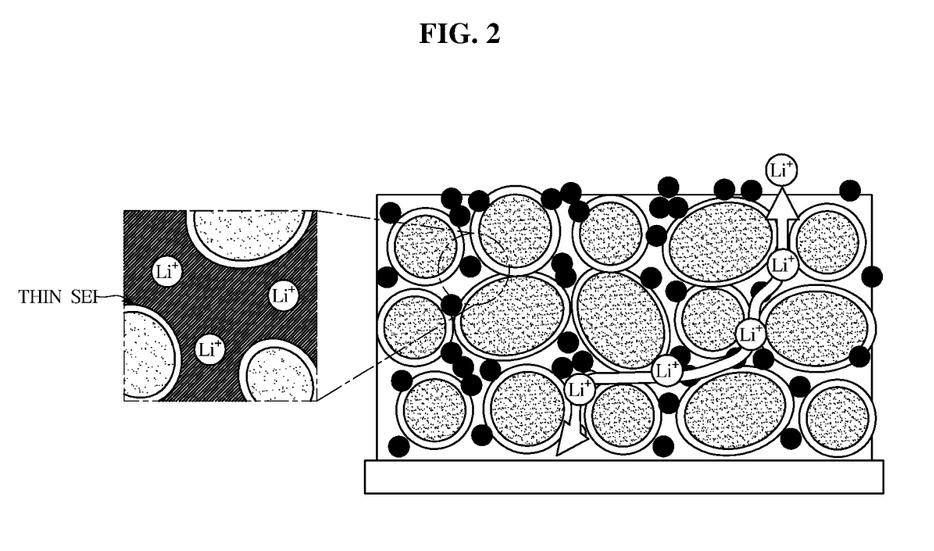
FIG. 2 shows a migration behavior of lithium ions in an exemplary lithium secondary battery.

FIGS. 1 and 2 show exemplary migration behaviors lithium ions in lithium secondary batteries. FIG. 1 shows a case in which EC is used as a solvent of an electrolyte, and FIG. 2 shows a case in which hydrofluoric ether is used as a cosolvent of an electrolyte.

As shown in FIG. 1, when a conventional ethylene carbonate (EC) solvent is used, EC is decomposed to form a thick SEI layer through which Li ions pass but the solvent cannot flow smoothly. That is, as the thickness of the SEI layer increases, resistance to Li ions increases. Further, as shown in an enlarged portion of FIG. 1, it may be confirmed that the solvent cannot permeate into micro pores of the electrode, but is locally distributed. Thus, migration of Li ions by the solvent is inevitably slow.

As shown in FIG. 2, FEC may form a thin EI layer to allow the solvent to permeate into the micro pores of the electrode. In addition, the perfluorinated ether may reduce the viscosity of the electrolyte as described above to increase Li-ion conductivity, thereby improving output characteristics.

A volume ratio of the perfluorinated ether-based solvent to the carbonate solvent may appropriately be adjusted according to types of electrode active materials, battery capacity, and the like. However, when a battery using graphite or a graphite-silicon composite is used as the anode active material, the safety of the electrolyte may be secured and the lithium secondary battery may have excellent output and lifespan characteristics by including the above-described two solvents within the ranges described above.

The electrolyte for a lithium secondary battery according to an exemplary embodiment of the present invention may include a lithium salt as an electrolyte salt used to increase ionic conductivity. The lithium salt is not particularly limited according to the present invention, and any lithium salt commonly used in lithium secondary batteries may be used without limitation. For example, the lithium salt may include one or more selected from the group consisting of $LiPF_6$, $LiFSi$, $LiBF_4$, $LiClO_4$, $LiCl$, $LiBr$, $LiI$, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_5)_4$, $Li(SO_2F)_2N$, and $(CF_3SO_2)_2NLi$. Preferably, the lithium salt may suitably include $LiPF_6$ and/or LiFSi.

A concentration of the lithium salt may be determined in consideration of ionic conductivity, or the like, and may be, for example, in the range of about 0.1 to 2.0 M, preferably, about 0.5 to 1.5 M. When the concentration of the lithium salt is less than the lower limit of the above-described ranges, for example, less than about 0.1 M, it may be difficult to obtain an ionic conductivity suitable for driving of the battery. On the contrary, when the concentration of the lithium salt is greater than the upper limit of the above-described ranges, for example, greater than about 2.0 M, the mobility of lithium ions may decrease due to an increased viscosity of the electrolyte and decomposition reactions of the lithium salt increase, thereby deteriorating battery performance. Thus, the concentration of the lithium salt is appropriately adjusted within the ranges described above.

A method of manufacturing the electrolyte for a lithium secondary battery according to an exemplary embodiment of the present invention is not particularly limited and may be any method well known in the art.

Injecting the electrolyte may be suitably performed in an appropriate stage of a preparation process of an electrochemical device according to a manufacturing process and required properties of a final product. For example, the injecting of the electrolyte may be applied before assembling the electrochemical device or applied to a final process of assembling the electrochemical device.

EXAMPLE

Hereinafter, properties such as miscibility and flame retardancy of the electrolyte composition for a lithium secondary battery according to an exemplary embodiment of the present invention will be described in detail according to the following examples and comparative example. However, the following examples and comparative examples are only for enhancement of understanding of the present invention, and the scope of the present invention is not limited thereto.

Evaluation of Miscibility of Electrolyte

In order to test miscibility of MFE and the lithium salt, a mixed solvent of FEC, EMC, and MFE mixed in a volume ratio of 1:6:3 (v/v/v) was referred to as S1, and a mixed solvent of EC, EMC, and MFE mixed in a volume ratio of 1:6:3 (v/v/v) was referred to as S2.

Subsequently, 1 mol of $LiPF_6$ was dissolved in the mixed solvent S1 of FEC/EMC/MFE (1:6:3, v/v/v) to prepare a 1 M $LiPF_6$ electrolyte (E1). Also, 1 mol of $LiPF_6$ was dissolved in the mixed solvent S2 of EC/EMC/MFE (1:6:3, v/v/v) to prepare a 1 M $LiPF_6$ electrolyte (E2).

In Table 1 below, Example 1 corresponds to E1, Comparative Example 1 corresponds to E2, Comparative Example 2 corresponds to S1, and Comparative Example 3 corresponds to S2. In addition, layer separation test results of the electrolytes in which amounts of the lithium salt and the solvent are different, are shown in Table 1 below.

TABLE 1

|  | Salt (M) | | Solvent (v/v/v/v) | | | | Results Layer separation |
| --- | --- | --- | --- | --- | --- | --- | --- |
|  | LiPF6 | LiFSi | FEC | EC | EMC | MFE | (O, X) |
| Example 1 | 1 |  | 10 |  | 60 | 30 | X |
| Example 2 |  | 1 | 10 |  | 60 | 30 | X |
| Example 3 | 0.5 | 0.5 | 10 |  | 60 | 30 | X |
| Example 4 | 0.5 | 0.5 | 10 | 10 | 50 | 30 | X |
| Comparative Example 1 | 1 |  |  | 10 | 60 | 30 | O |
| Comparative Example 2 |  |  | 10 |  | 60 | 30 | X |
| Comparative Example 3 |  |  |  | 10 | 60 | 30 | X |
| Comparative Example 4 | 1 |  | 10 |  | 30 | 60 | O |
| Comparative Example 5 | 1 |  | 5 |  | 55 | 40 | O |
| Comparative Example 6 | 1 |  | 5 |  | 45 | 50 | O |
| Comparative Example 7 | 1 |  | 20 |  | 30 | 50 | O |
| Comparative Example 8 | 1 |  | 20 |  | 40 | 40 | O |
| Comparative Example 9 | 0.5 | 0.5 |  | 10 | 60 | 30 | O |
| Comparative Example 10 | 0.5 | 0.5 | 20 |  | 40 | 40 | O |
| Comparative Example 11 | 0.5 | 0.5 | 10 |  | 40 | 50 | O |

TABLE 1-continued

|  | Salt (M) | | Solvent (v/v/v/v/v) | | | | Results Layer separation (O, X) |
| --- | --- | --- | --- | --- | --- | --- | --- |
|  | LiPF6 | LiFSi | FEC | EC | EMC | MFE |  |
| Comparative Example 12 | 0.5 | 0.5 | 10 | 10 | 40 | 40 | O |

Figure 3:
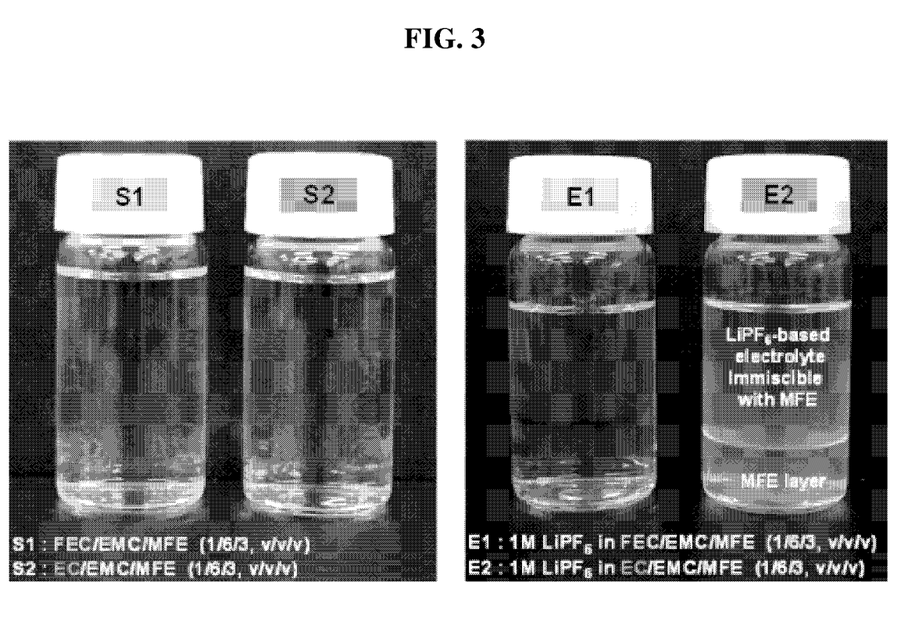
FIG. 3 shows photographs for describing miscibility of an electrolyte for an exemplary lithium secondary battery according to an exemplary embodiment.

1) FEC: fluoroethylene carbonate
2) EC: ethylene carbonate
3) EMC: ethylmethyl carbonate
4) MFE: nonafluorobutyl methyl ether FIG. 3 shows photographs for describing miscibility of the electrolyte for a lithium secondary battery according to an exemplary embodiment of the present invention.

As shown in FIG. 3, in the case of both S1 including FEC, EMC, and MFE solvents without the lithium salt and S2 including EC, EMC, and MFE solvents, no layer separation was observed. Thus, it may be confirmed that MFE was miscible with the other solvents.

Meanwhile, as a result of the miscibility tests with the lithium salt, it was confirmed that the lithium salt was miscible with the mixed solvent according to Example 1 and the mixed solvent was available for the electrolyte of the lithium secondary battery. However, in the case of Comparative Example 1 in which EC was used instead of FEC, layer separation was observed because an MFE layer was formed at a lower portion of the solution as shown in FIG. 3.

In addition, as shown in Table 1 above, in the case of Comparative Example 4 in which the MFE content was greater than that of EMC, layer separation was observed. Once layer separation occurs as described above, the separator cannot be sufficiently impregnated due to the lack of the electrolyte, and ionic conductivity may decrease, durability may deteriorate, and resistance (output) may decrease. Thus, the mixed solvent according to Comparative Example 4 is not suitable for the solvent of the electrolyte.

According to various exemplary embodiments of the present invention, miscibility of the electrolyte may be improved by adding FEC instead of EC and using a greater EMC content than that of MFE.

Evaluation of Flame Retardancy of Electrolyte 1.0 M $LiPF_6$ was mixed with a mixed solvent of fluoroethylene carbonate (FEC), ethylmethyl carbonate (EMC), and nonafluorobutyl methyl ether (MFE) mixed in a volume ratio of 1:6:3 to prepare an FEC-MFE electrolyte.

In the same manner, 1.0 M $LiPF_6$ was mixed with each of a mixed solvent of FEC, EMC, and diethyl carbonate (DEC) mixed in a volume ratio of 1:6:3 and a mixed solvent of ethylene carbonate (EC), EMC, and DEC mixed in a volume ratio of 1:6:3 to prepare an FEC-DEC electrolyte and an EC-DEC electrolyte.

In order to evaluate flammability of the electrolytes, glass fiber was wet with each of the electrolytes and self-extinguishing time (SET) thereof was measured. The SET refers to a time until an electrolyte self-extinguishes after the electrolyte is ignited. In consideration of combustion time varying according to a weight of the electrolyte, combustion time per weight (unit: s/g) was used according to the present invention.

The electrolytes were classified into non-flammable when the SET was in the range of 0 to 5 s/g, flame retardant when the SET was in the range of 5 to 20 s/g, and flammable when the SET was 20 s/g or greater.

Figure 4:
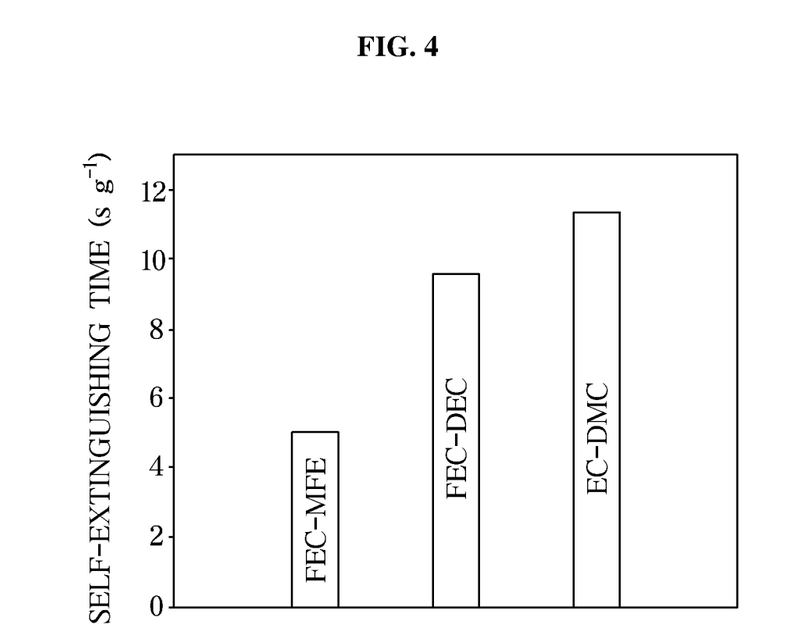
FIG. 4 is a graph illustrating self-extinguishing time measured to evaluate flame retardancy of an exemplary electrolyte for an exemplary lithium secondary battery according to an exemplary embodiment.

FIG. 4 is a graph illustrating self-extinguishing time measured to evaluate flame retardancy of the electrolyte for a lithium secondary battery according to an exemplary embodiment of the present invention.

The FEC-DEC electrolyte and the EC-DEC electrolyte may be flame-retardant electrolytes commonly used in the art. According to the SET values of FIG. 4, the FEC-MFE electrolyte including both perfluorinated ether (MFE) and fluorinated carbonate (FEC) had an SET value of about 5.0 s/g, thereby being regarded as a non-flammable electrolyte.

That is, the combustion reaction of the electrolyte may be delayed or terminated by adding the fluorinated solvents of FEC and MFE to the electrolyte including the flammable organic solvent, thereby improving flame retardancy of the electrolyte.

Hereinafter, charging/discharging characteristics and lifespan characteristics of a lithium secondary battery including the electrolyte composition according to an embodiment of the present invention will be described in detail according to the following examples and comparative examples. However, the following examples and comparative examples are only for enhancement of understanding of the present invention, and the scope of the present invention is not limited thereto.

Experimental Example 1

Electrolyte compositions for lithium secondary batteries according to the following examples and comparative examples were prepared in accordance with the composition ratios listed below in order to perform tests to evaluate battery characteristics. Amounts of the lithium salt and solvents of respective examples and comparative examples are shown in Table 2 below.

An anode mixture slurry was prepared by mixing 96 wt % of graphite as an anode active material, 2 wt % of styrene-butadiene rubber (SBR) as a binder, and 2 wt % of carboxymethyl cellulose (CMC). The anode mixture slurry was coated on opposite surfaces of a copper foil, dried, and laminated to prepare an anode.

A cathode slurry was prepared by mixing $LiNi_{0.4}Mn_{1.6}O_4$ as a cathode active material, poly(vinylidene fluoride) (PVdF) as a binder for a cathode, and super-P carbon as a conductive material in a weight ratio of 90:5:5, and dispersing the mixture in N-methyl pyrrolidone. The cathode slurry was coated on an aluminum foil, dried, and laminated using a roll press. The lamination process may be performed to improve mutual bonding forces among the active material, the conductive material, and the binder, and to effectively adhere these materials to the current collector. After the lamination process, the laminated layers were cut to an appropriate size according to a cutting process and dried in a vacuum oven at a temperature of about 110° C. for 24 hours or more to prepare a cathode. Then, a coin cell was prepared using the prepared cathode according to any known method.

A polyethylene separator was interposed between the prepared anode and cathode to prepare an electrode assembly, and an electrolyte having a composition ratio shown in Table 2 below was injected thereinto to prepare a pouch-type lithium secondary battery. All preparation processes of the electrode were performed in a dry room and preparation of the battery was performed in a glove box maintained in an argon atmosphere.

TABLE 2

| | Salt (M) | | Solvent (v/v/v/v/v) | | | | |
|---|---|---|---|---|---|---|---|
| | LiPF6 | LiFSi | FEC | EC | EMC | MFE | DEC |
| Example 1 | 1 | | 10 | | 60 | 30 | |
| Example 2 | | 1 | 10 | | 60 | 30 | |
| Example 3 | 0.5 | 0.5 | 10 | | 60 | 30 | |
| Comparative Example 1 | 1 | | | 10 | 60 | 30 | |
| Comparative Example 2 | 1 | | 10 | | 60 | | 30 |
| Comparative Example 3 | 1 | | | 10 | 60 | | 30 |
| Comparative Example 4 | 1 | | | 30 | 40 | | 30 |

Figure 5:
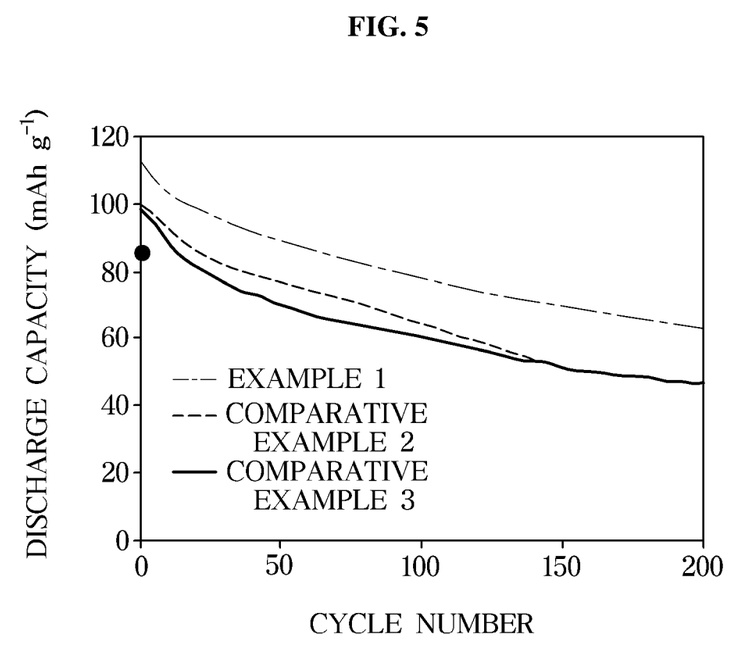
FIG. 5 is a graph illustrating lifespan characteristics of an exemplary lithium secondary batteries according to an exemplary embodiment evaluated at a temperature of 30° C.

1) FEC: fluoroethylene carbonate
2) EC: ethylene carbonate
3) EMC: ethylmethyl carbonate
4) MFE: nonafluorobutyl methyl ether
5) DEC: diethyl carbonate FIG. 5 is a graph illustrating lifespan characteristics of a lithium secondary battery according to an exemplary embodiment evaluated at a temperature of 30° C.

As shown in FIG. 5, the lithium secondary battery using the FEC-MFE electrolyte according to Example 1 had a capacity of about 70% of the initial capacity even after 200 cycles. Thus, it may be confirmed that the lithium secondary battery according to Example 1 had a relatively higher discharge capacity retention ratio than those of the lithium secondary batteries according to Comparative Examples 2 and 3.

Figure 6:
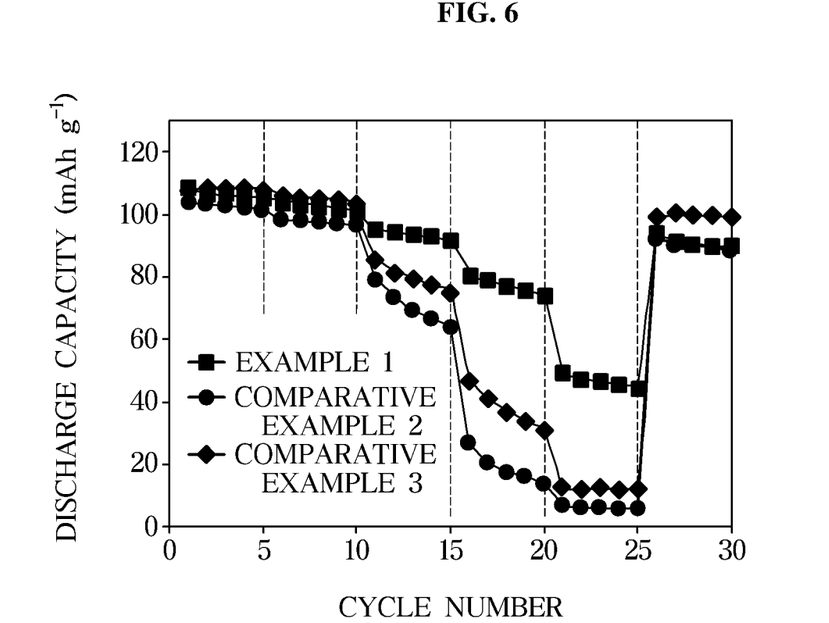
FIG. 6 is a graph illustrating rate characteristics of an exemplary lithium secondary battery according to an exemplary embodiment.

FIG. 6 is a graph illustrating rate characteristics of a lithium secondary battery according to an exemplary embodiment. In FIG. 6, a discharge rate at which energy of a battery is completely discharged for 1 hour is defined as 1 C (C-rate). That is, 2 C means the battery completely discharges its capacity in 30 minutes, and C/5 means the battery completely discharges its capacity in 5 hours. Tests were repeated at every 5 cycles to ensure representativeness of data, and rate characteristics were evaluated by measuring at different C-rates.

As such, as shown in FIG. 6, it may be confirmed that the lithium secondary battery according to Example 1 using the FEC-MFE electrolyte had higher capacities at C-rates of 3, 5, and 7 where the charging/discharging rate increased, indicating excellent high-rate discharging performance, in comparison with the lithium secondary batteries according to Comparative Examples 2 and 3.

In addition, because the lithium secondary battery according to Example 1 had an initial C/2 capacity ratio similar to those of Comparative Examples, it may be confirmed that degradation of the lithium secondary battery was inhibited even in a high-rate charging and discharging environment.

Meanwhile, as a result of measuring viscosity of the electrolytes according to Comparative Examples 2 and 3 and Example 1, the electrolyte according to Example 1 had a viscosity of 1.47 cP, the electrolyte according to Comparative Example 2 had a viscosity of 2.22 cP, and the electrolyte according to Comparative Example 3 had a viscosity of 2.3 cP. The lithium secondary battery according to the present invention may have improved output characteristics by introducing the perfluorinated ether-based solvent capable of lowering the viscosity of the electrolyte.

Meanwhile, the electrolyte composition for a lithium secondary battery according to the various exemplary embodiments may also be applied to a case where the cathode active material or the anode active material is changed.

Experimental Example 2

The same procedure as in Experimental Example 1 was carried out, except that the operating environment of 4.2 V was simulated using 60 mol % of Ni, 20 mol % of Co, and 20 mol % of Mn as cathode active materials.

As shown in Table 2 above, an electrolyte of Example 3 was prepared in the same manner as in Example 1, except that 0.5 mol of $LiPF_6$ and 0.5 mol of LiFSi were used as lithium salts.

An electrolyte of Comparative Example 4 was prepared in the same manner as in Example 1, except that 1.0 M $LiPF_6$, as a lithium salt, was added to a mixed solvent of EC, EMC, and DEC mixed in a volume ratio of 3:4:3.

Figure 7:
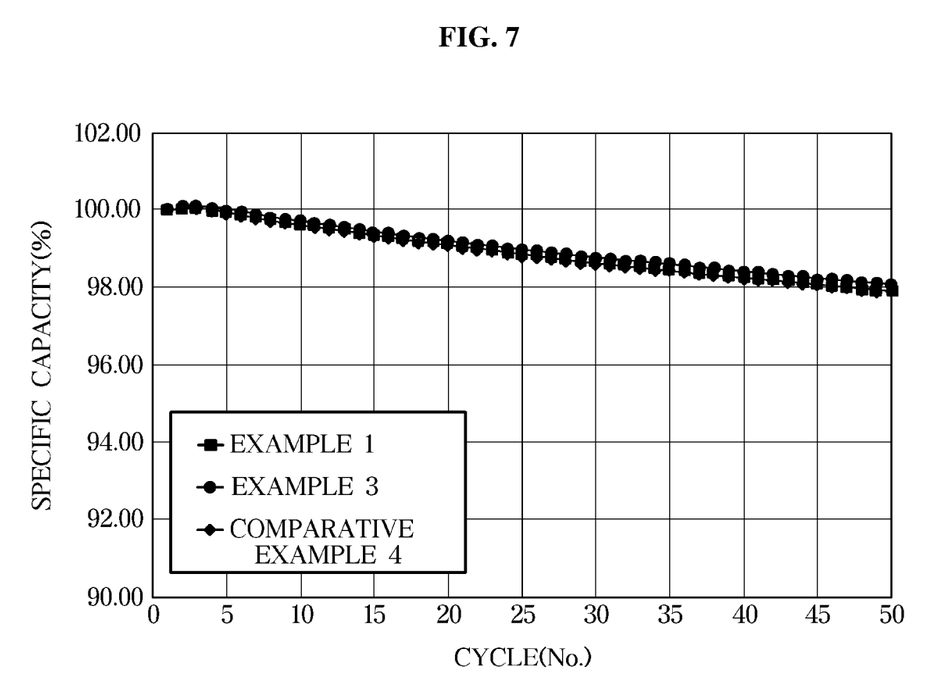
FIG. 7 is a graph illustrating lifespan characteristics of an exemplary lithium secondary battery according to an exemplary embodiment evaluated at a temperature of 45° C.

FIG. 7 is a graph illustrating lifespan characteristics of a lithium secondary battery according to another embodiment evaluated at 45° C.

As shown in FIG. 7, it may be confirmed that the lithium secondary batteries using the electrolytes according to Examples 1 and 3 had high temperature durability equal to or better than that of the lithium secondary battery according to Comparative Example 4 even in the case where the Ni-rich cathode active material was used.

Figure 8:
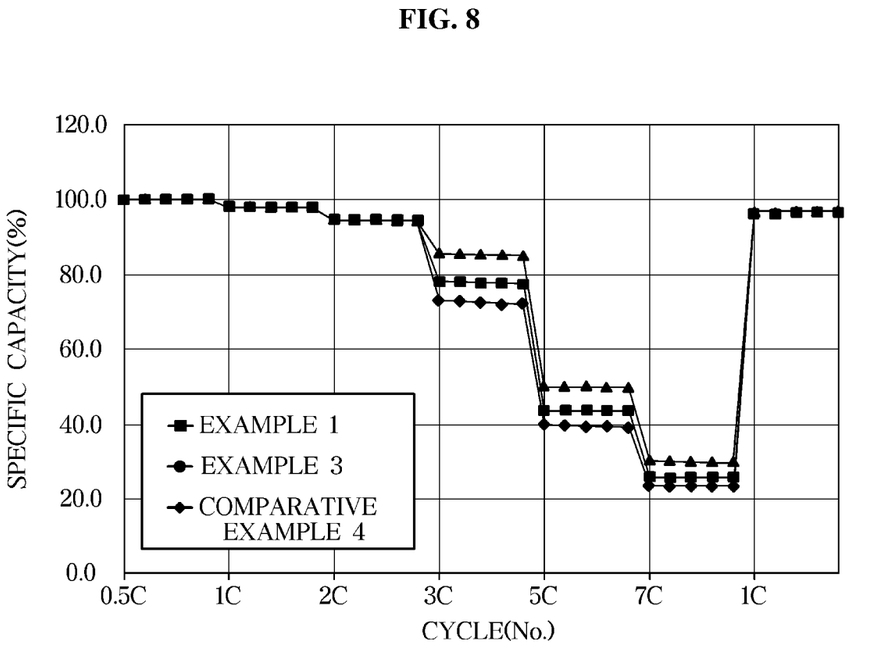
FIG. 8 is a graph illustrating rate characteristics of an exemplary lithium secondary battery according to an exemplary embodiment.

FIG. 8 is a graph illustrating rate characteristics of a lithium secondary battery according to another embodiment.

As shown in FIG. 8, it may be confirmed that the lithium secondary batteries according to Examples 1 and 3 using the FEC-MFE electrolyte had higher capacity at C-rates of 3, 5, and 7 where the charging/discharging rate increased, indicating excellent high-rate discharging performance, in comparison with the lithium secondary battery according to Comparative Example 4

In addition, because the lithium secondary batteries of Examples 1 and 3 had initial 1 C capacity ratios similar to that of Comparative Examples, it may be confirmed that degradation of the lithium secondary battery was inhibited.

Experimental Example 3

An experiment was carried out in the same manner as in Experimental Example 2, except that a graphite-silicon composite having a specific capacity of 550 mAh/g was used as the anode active material.

Figure 9:
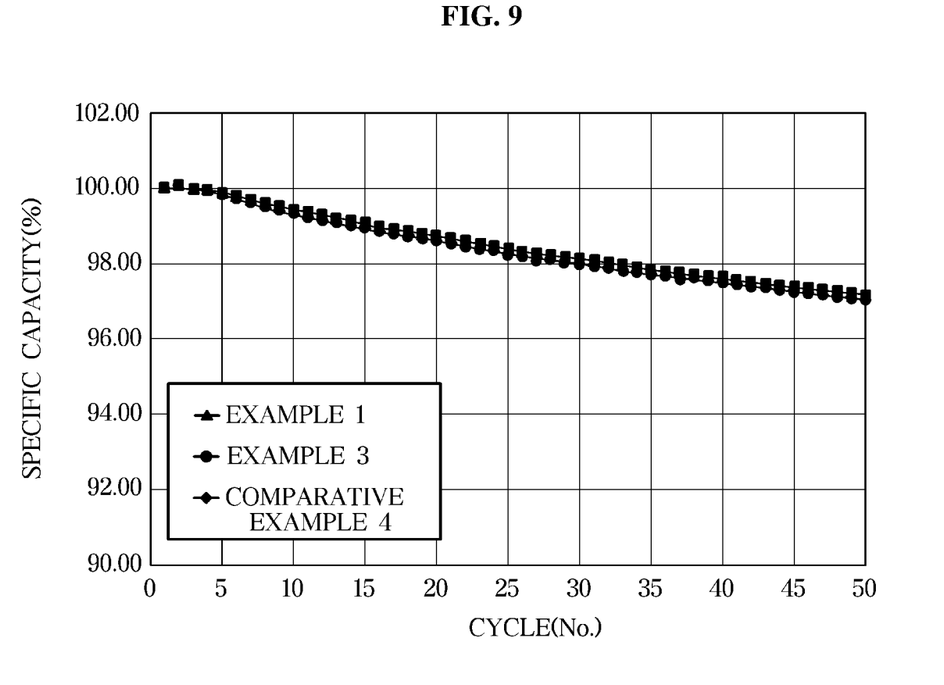
FIG. 9 is a graph illustrating lifespan characteristics of an exemplary lithium secondary battery according to an exemplary embodiment evaluated at a temperature of 45° C.

FIG. 9 is a graph illustrating lifespan characteristics of a lithium secondary battery according to another embodiment evaluated at 45° C.

As shown in FIG. 9, it may be confirmed that the lithium secondary batteries using the electrolytes according to Examples 1 and 3 had high temperature durability equal to or better than that of the lithium secondary battery according to Comparative Example 4 even in the case where the graphite-silicon composite was used as the anode active material.

Figure 10:
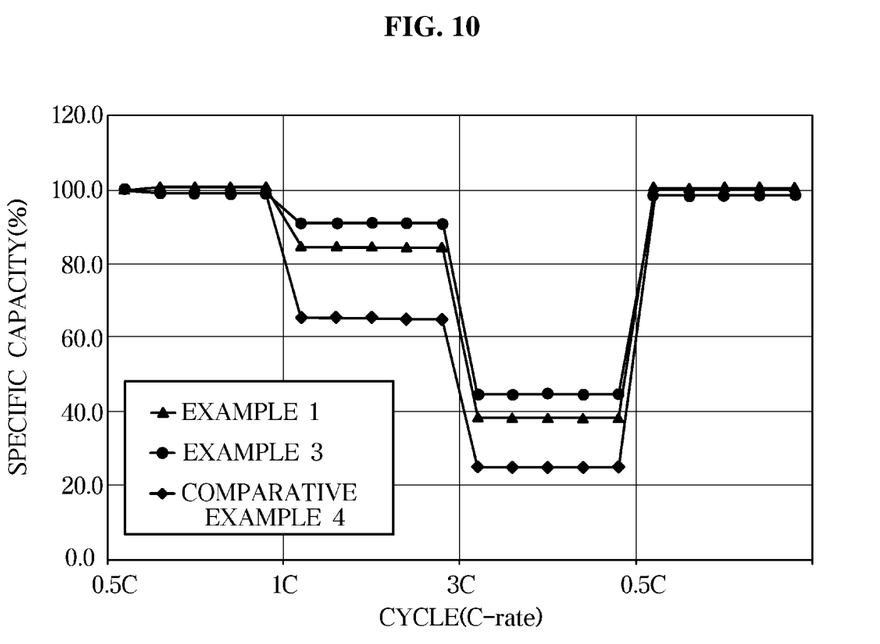
FIG. 10 is a graph illustrating rate characteristics of an exemplary lithium secondary battery according to an exemplary embodiment.

FIG. 10 is a graph illustrating rate characteristics of a lithium secondary battery according to an exemplary embodiment.

As shown in FIG. 10, it may be confirmed that the lithium secondary batteries according to Examples 1 and 3 using the FEC-MFE electrolyte had higher capacities at C-rates of 3, 5, and 7 where the charging/discharging rate increased, indicating excellent high-rate discharging performance, in comparison with the lithium secondary battery according to Comparative Example 4.

In conclusion, the electrolyte composition according to various exemplary embodiments may reduce the EC content, improve output characteristics, and secure thermal stability by including the perfluorinated ether-based compound as a solvent, and thus the safety of the lithium secondary battery may be improved. Accordingly, the lithium secondary battery including the electrolyte composition according to the embodiment is available in a high-temperature, high-voltage environment and applicable to large- and medium-sized batteries for vehicles.

As is apparent from the above description, the electrolyte of an exemplary lithium secondary battery according to various exemplary embodiment may improve not only output characteristics by using the perfluorinated ether-based compound as a solvent, but also the safety of the lithium secondary battery by improving thermal stability.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A lithium secondary battery comprising:
a cathode;
an anode;
a separator interposed between the cathode and the anode; and
an electrolyte,
wherein the electrolyte comprises:
a lithium salt; and
a solvent component comprising a perfluorinated ether-based solvent, fluoroethylene carbonate (FEC), and ethylmethyl carbonate (EMC),
wherein the solvent component comprises:
20 to 50 vol % of the perfluorinated ether-based solvent,
20 vol % or less of the FEC (excluding 0 vol %), and
50 to 70 vol % of the EMC,
based on the total volume of the electrolyte composition,
wherein the perfluorinated ether-based solvent comprises one or more selected from the group consisting of nonafluorobutyl methyl ether, nonafluorobutyl ethyl ether, nonafluorobutyl-2-fluoroethyl ether, nonafluorobutyl-2,2,2-trifluoroethyl ether, nonafluorobutyl pentafluoroethyl ether, nonafluoropropyl ethyl ether, nonafluoropropyl propyl ether, and heptafluoropropyl methyl ether.

2. The lithium secondary battery according to claim 1, wherein a combined content of the FEC and the perfluorinated ether-based solvent is in a range of about 30 to 50 vol % based on the total volume of the electrolyte composition.

3. The lithium secondary battery according to claim 1, wherein the solvent component further comprises ethylene carbonate (EC).

4. The lithium secondary battery according to claim 3, wherein an EC content is in a range of about 10 vol % or less based on the total volume of the electrolyte composition.

5. The lithium secondary battery according to claim 3, wherein the FEC content is greater than or equal to the EC content.

6. The lithium secondary battery according to claim 1, wherein the electrolyte has a viscosity of about 5 cP or less.

7. The lithium secondary battery according to claim 1, wherein the lithium salt comprises one or more selected from the group consisting of $LiPF_6$, LiFSi, $LiBF_4$, $LiClO_4$, LiCl, LiBr, LiI, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_5)_4$, $Li(SO_2F)_2N$, and $(CF_3SO_2)_2NLi$.

8. The lithium secondary battery according to claim 1, wherein a cathode active material comprises a nickel composite including Ni content of about 20% to 100% based on the total mol of the nickel composite.

9. The lithium secondary battery according to claim 8, wherein the nickel composite comprises a lithium nickel-manganese-cobalt ternary cathode active material or a lithium nickel-manganese composite oxide.

10. The lithium secondary battery according to claim 1, wherein an anode active material comprises a silicon-carbon composite.

11. A vehicle comprising the lithium secondary batter according to claim 1.

* * * * *